(12) United States Patent
Jiang et al.

(10) Patent No.: US 11,136,488 B1
(45) Date of Patent: Oct. 5, 2021

(54) BIODIESEL-BASED CONSTANT RHEOLOGICAL PROPERTY DRILLING FLUID CONTAINING INTELLIGENT TEMPERATURE RESPONSIVE POLYMER

(71) Applicant: China University of Petroleum (Beijing), Beijing (CN)

(72) Inventors: Guancheng Jiang, Beijing (CN); He Shi, Beijing (CN); Kaixiao Cui, Beijing (CN); Yinbo He, Beijing (CN); Lili Yang, Beijing (CN); Tengfei Dong, Beijing (CN); Chunyao Peng, Beijing (CN); Xuwu Luo, Karamay (CN); Bin Tan, Beijing (CN); Jun Cai, Beijing (CN); Xing Liang, Beijing (CN); Zhiliang You, Beijing (CN); Yong Wang, Beijing (CN)

(73) Assignee: CHINA UNIVERSITY OF GEOSCIENCES (BEIJING), Beijing (CN)

( * ) Notice: Subject to any disclaimer, the term of this patent is extended or adjusted under 35 U.S.C. 154(b) by 0 days.

(21) Appl. No.: 17/228,424

(22) Filed: Apr. 12, 2021

(30) Foreign Application Priority Data

Jul. 15, 2020 (CN) .......................... 202010681142.4

(51) Int. Cl.
*C09K 8/36* (2006.01)
*C08G 63/685* (2006.01)
*C08G 63/78* (2006.01)

(52) U.S. Cl.
CPC ............ *C09K 8/36* (2013.01); *C08G 63/6856* (2013.01); *C08G 63/78* (2013.01)

(58) Field of Classification Search
USPC .................................................. 507/100, 117
See application file for complete search history.

(56) References Cited

U.S. PATENT DOCUMENTS

| 9,469,803 | B2 | 10/2016 | Wagle et al. |
| 2004/0110642 | A1 | 6/2004 | Thompson et al. |
| 2009/0163386 | A1 | 6/2009 | Dino |
| 2015/0159075 | A1 | 6/2015 | Harris et al. |

FOREIGN PATENT DOCUMENTS

| CA | 2830996 | A1 | 11/2012 |
| CN | 102234501 | A | 11/2011 |
| CN | 104861944 | A | 8/2015 |
| CN | 108276512 | A | 7/2018 |
| CN | 109054782 | A | 12/2018 |
| CN | 109423261 | A | 3/2019 |
| CN | 109652030 | A | 4/2019 |
| CN | 109721729 | A | 5/2019 |
| CN | 109762171 | A | 5/2019 |
| CN | 111925779 | A | 11/2020 |

OTHER PUBLICATIONS

Yang, S. et al., "Research Progress of Rheology Modifier for Drilling Fluids," Fine Chemicals, vol. 37, No. 9, Sep. 30, 2020, pp. 1744-1754—with English abstract.
Sun, J. et al., "Development of Key Additives for Organoclay-Free Oil-Based Drilling Mud and System Performance Evaluation," Petroleum Exploration and Development, vol. 45, No. 4, Aug. 31, 2018, pp. 764-769.
He, Y. et al., "Polyhydroxy Gemini Surfactant as a Mechano-Responsive Rheology Modifier for Inverted Emulsion Drilling Fluid," RSC Advances, vol. 8, No. 1, Aug. 31, 2018, pp. 342-353.
Huang, X. et al., "Synthesis of a Modified Fatty Acid As Rheology Modifier and Its Application," Journal of China University of Petroleum, vol. 43, No. 3, Jun. 30, 2019, pp. 107-112—with English abstract.
Han, Z., "Development and Working Mechanism of Flow Pattern Enhancer for Synthetic Base Drilling Fluids," Drilling Fluid & Completion Fluid, vol. 37, No. 2, Mar. 31, 2020, pp. 148-152—with English abstract.
Shi, H. et al., "Study on the Formation Mechanism of a Flat Rheology by Poly (Diethylenetriamine Dimer Acid Amide) and Organoclay in Nonaqueous Drilling Fluids Over a Wide Temperature Range," Journal of Dispersion Science and Technology, Jan. 31, 2020, pp. 1-12.
Li, C. et al., "Development and Performance Evaluation of Rheological Stabilizer with Deepwater Synthetic Based Drilling Fluid," Guangdong Chemical Industry, vol. 45, No. 8, Dec. 31, 2018, pp. 103-105—with English abstract.
Huang, X. et al., "Improvement of Rheological Properties of Invert Drilling Fluids by Enhancing Interactions of Water Droplets Using Hydrogen Bonding Linker," Colloids and Surfaces A: Physicochemical and Engineering Aspects, Oct. 5, 2016, pp. 467-475.
Geng, T., "Development of New Mechanism and System of Flat-Rheological Synthetic Base Drilling Fluid," Ocean Engineering Equipment and Technology, vol. 6, Nov. 30, 2019, pp. 315-319—with English abstract.

(Continued)

*Primary Examiner* — Terressa Boykin
(74) *Attorney, Agent, or Firm* — Calfee, Halter & Griswold LLP

(57) ABSTRACT

The present invention relates to the technical field of oil and gas drilling, and discloses a biodiesel-based constant rheological property drilling fluid containing intelligent temperature responsive polymer, which contains two or more of the following components which are stored in admixture or separately: base oil biodiesel, aqueous phase, emulsifier, organic soil, constant rheological property flow pattern modifier, hydrolysis inhibitor, filtrate reducer and weighting material; the constant rheological property flow pattern modifier is an intelligent temperature responsive polymer, and the polymer contains structural units provided by bis-hydroxyethyl bis-hydroxypropyl stearyl ammonium chloride, ethylene bis-stearamide and dimerized fatty acid. The drilling fluid provided by the present invention has excellent environmental protection property and degradability, and has conventional rheological property, weak gel structure and fluid loss property which are equivalent to those of the conventional oil-based drilling fluid, and also has excellent temperature resistance, CaO compatibility and constant rheological property.

20 Claims, No Drawings

(56) References Cited

OTHER PUBLICATIONS

Shi, H. et al., "Study on Morphology and Rheological Property of Organoclay Dispersions in Soybean Oil Fatty Acid Ethyl Ester over a Wide Temperature Range," ACS OMEGA, vol. 5, No. 4, Feb. 4, 2020, pp. 1851-1861.
Li, W. et al., "An Investigation on Environmentally Friendly Biodiesel-Based Invert Emulsion Drilling Fluid," J Petrol Explor Prod Technol, Nov. 7, 2015, pp. 505-517.
Dankwa, O. K. et al., "Investigating the Potential Use of Waste Vegetable Oils to Produce Synthetic Base Fluids for Drilling Mud Formulation," Society of Petroleum Engineers, Aug. 2018, pp. 1-12.
Sulaimon, A. A. et al., "Performance Enhancement of Selected Vegetable Oil as Base Fluid for Drilling HPHT Formation," Journal of Petroleum Science and Engineering, vol. 152, Apr. 2017, pp. 49-59.
Said, M. M. et al., "The Use of Palm Oil Fatty Acid Methyl Ester as a Base Fluid for a Flat Rheology High-Performance Drilling Fluid," Journal of Petroleum Science and Engineering, vol. 166; Jul. 2018, pp. 969-983.
Oseh, J. O. et al., "Investigating Almond Seed Oil as Potential Biodiesel-Based Drilling Mud," Journal of Petroleum Science and Engineering, vol. 181, Oct. 2019, 106201.

BIODIESEL-BASED CONSTANT RHEOLOGICAL PROPERTY DRILLING FLUID CONTAINING INTELLIGENT TEMPERATURE RESPONSIVE POLYMER

CROSS REFERENCE TO RELATED APPLICATIONS

This application claims priority to Chinese Application No. 202010681142.4, filed on Jul. 15, 2020, entitled "Biodiesel-based constant rheological property drilling fluid containing intelligent temperature responsive polymer", which is specifically and entirely incorporated by reference.

FIELD OF THE INVENTION

The present invention relates to the technical field of oil and gas drilling, in particular to a biodiesel-based constant rheological property drilling fluid containing intelligent temperature responsive polymer.

BACKGROUND OF THE INVENTION

The drilling fluid is a circulating flushing medium used in the drilling process, has multiple functions of suspending and carrying drill cuttings, preventing borehole wall collapse, protecting oil and gas reservoir, cooling and lubricating drilling tool, transferring pump power, recording geological data and the like, and is an important factor influencing the success and speed of drilling.

In recent years, with the increasing worldwide oil and gas demand and the gradual exhaustion of onshore oil and gas resources, the number of deepwater drilling wells is increased year by year, and great challenges are brought to drilling fluid technology. In the deepwater drilling process, sensitive and low-cementation strata can be drilled, borehole wall instability is easy to occur, and meanwhile, the low-temperature and high-pressure environment near mud line is very suitable for the generation of natural gas hydrate and is easy to block pipelines to cause underground accidents. Under such severe environments, even water-based drilling fluids with strong inhibition performance cannot completely meet the requirements of drilling operation, and water-in-oil emulsified drilling fluids show good compatibility with deepwater drilling, but two difficulties still exist.

Firstly, the rheological property of the traditional water-in-oil emulsified drilling fluid is more easily influenced by temperature, can be violently changed in a deep water large temperature difference environment and causes large fluctuation of Equivalent Circulating Density (ECD), and is easy to cause malignant loss in the well section with narrow safety density window; secondly, the fragile ecological environment of ocean deep water puts more stringent requirements on the environmental protection performance of the drilling fluid, and the early diesel oil-based, mineral oil-based and even later low-toxicity mineral oil-based drilling fluids are difficult to meet.

In order to solve the above problems, constant rheological property synthetic base drilling fluid system which has excellent environmental protection performance and has rheological property insensitive to temperature change is developed, such as RHELIANT PLUS system of MI-SWACO company, BaraECD system of Baroid company, and Flat-Pro system of domestic COSL company. First, in order to meet the marine environmental protection requirements and reduce the tackifying effect of systems at low temperature, these systems select synthetic paraffins with very low aromatic content and stable viscosity-temperature characteristics as the continuous phase, and the most commonly used products include Shell's gas oil Saraline 185V and Exxon's low toxicity mineral spirit Escaid 110 currently. The critical rheological parameters dynamic shear force YP, 6r reading and final shear (Gel 10 min) of the drilling fluid system are then kept substantially constant over a large temperature difference range, the so-called constant rheological property, by the flow pattern modifier itself (e.g., BaraECD) or its synergistic effect with the organic soil (e.g., RHELIANT PLUS and Flat-Pro), thereby maintaining a stable equivalent circulating density. These systems have been successfully applied in deepwater drilling in gulf of Mexico, North Sea, South China Sea and other places, generally resist temperatures up to 200° C., and can maintain constant rheological properties in the range of 2-120° C., but the cost of drilling fluid preparation is high due to the fact that continuous phase is expensive, and the problems that the continuous phase is difficult to degrade and cannot be regenerated under anaerobic conditions still exist. For this reason, better alternatives are continuously sought.

The biodiesel is fatty acid ester mixture prepared by carrying out ester exchange reaction on animal and vegetable oil and short-chain alcohol, and has the advantages of simple preparation, high flash point, extremely low biotoxicity, high degradation rate under anaerobic conditions, renewability and the like. In addition, with the maturity of the current technologies such as transgenosis, the biodiesel gradually shows advantages in yield and price, which all provide feasibility for using the biodiesel as continuous phase of cheap, environment-friendly and easily degradable water-in-oil emulsified drilling fluid, and related researches on the biodiesel-based drilling fluid are gradually developed at home and abroad, wherein typical cases are as follows:

(1) Preparing biodiesel from kitchen waste oil. Biodiesel is prepared from kitchen waste oil and used as base oil to prepare water-in-oil emulsified drilling fluid by Li Wai et al., and on the basis of further investigating influence factors such as emulsion stability, rheological property, temperature resistance and pollution resistance, key components such as emulsifier, organic soil and flow pattern modifier are optimized to form a set of biodiesel-based drilling fluid system, the system has low biotoxicity and high degradability, the conventional performance is equivalent to that of the conventional oil-based drilling fluid, but the system is sensitive to CaO, and the temperature resistance is only 120° C., and can be severely thickened when the CaO concentration is too high and the temperature is too high. In addition, severe thickening can be caused along with the temperature reduction within the range of 20-120° C., constant rheological property is not realized, and the research does not investigate the rheological property of the drilling fluid under the deep water low-temperature condition (2-4° C.). Biodiesel is prepared from kitchen waste oil and used as base oil to prepare water-in-oil emulsified drilling fluid with conventional oil-based drilling fluid treating agent by O. K. Dankwa et al. The research shows that the biodiesel-based drilling fluid system has excellent environmental protection performance and is expected to replace the traditional oil-based drilling fluid, but the system has higher temperature sensitivity, YP, gel strength and the like of the system are obviously reduced along with the temperature rise at 25-70° C., the rheological parameters at high temperature are lower, and the system is not beneficial to solid phase suspension and well bore cleaning. In addition, the research does not investigate the rheological property of the drilling fluid under the deep water low-temperature condition.

(2) Preparing biodiesel from palm oil. The research on the palm oil biodiesel-based drilling fluid is carried out by Aliyu A et al., and the influence of the addition amount of emulsifier, the density, the temperature and the like on the system performance is analyzed. The research shows that under the conventional API test condition, the palm oil biodiesel-based drilling fluid has the performance equivalent to that of the traditional oil-based drilling fluid, but the rheological property is greatly influenced by the temperature, the thickening is serious along with the temperature reduction, the temperature resistance of the system is limited, and the serious thickening and even curing phenomenon appears after the aging at 200° C. Mohammed Mokhtar Said et al. replaced the base oil Escaid 110 of the original Escaid 110-based constant rheological property system with palm oil biodiesel, and adjusted the addition of other treating agents, and formed a biodiesel-based drilling fluid with certain constant rheological property on the basis of the replacement, thereby indicating the feasibility of biodiesel-based constant rheological property drilling fluid in engineering, but the system is still difficult to be compatible with CaO, and the temperature resistance is poor, and the performance changes greatly after aging at 160° C., and the constant rheological property is lost.

(3) Preparing biodiesel from rapeseed oil. Biodiesel is prepared from rapeseed oil and used as continuous phase to prepare water-in-oil emulsified drilling fluid by Jeffrey O. Oseh et al. Studies show that the system is equivalent to the traditional oil-based drilling fluid in low-temperature fluidity, rheological parameters, fluid loss property and shale inhibition, but the system has obvious phenomena of low-temperature thickening and high-temperature viscosity reduction and does not have constant rheological property.

In general, the current biodiesel-based drilling fluid system generally has excellent environmental protection performance and degradability, and has conventional rheological property, weak gel structure and fluid loss property equivalent to those of the traditional oil-based drilling fluid. The defects of the system are that the temperature resistance is insufficient (generally not more than 150° C.) and the system is sensitive to alkalinity regulator CaO necessary for the water-in-oil emulsified drilling fluid, the reason is that the high temperature can cause ester hydrolysis, then hydrolysis products can have saponification reaction with $Ca^{2+}$ in the system, the system is thickened severely and even solidified. CaO can provide alkaline environment for the system, the concentration increase of the CaO can greatly promote the process, and the temperature for hydrolysis is reduced.

In addition, due to the nature problem of biodiesel, the rheological properties of the systems are mostly seriously influenced by the temperature, and the systems are thickened severely at low temperature and reduced in viscosity at high temperature, do not have constant rheological property and are not suitable for deep water drilling with large temperature difference. Therefore, for the biodiesel-based drilling fluid, the poor temperature resistance, CaO compatibility and constant rheological property are one of the technical problems to be solved.

Therefore, the development of a new biodiesel-based drilling fluid with good temperature resistance, CaO compatibility and constant rheological property has important practical significance.

SUMMARY OF THE INVENTION

The present invention aims to overcome the defects of poor temperature resistance, CaO compatibility and constant rheological property of the biodiesel-based drilling fluid in the prior art.

In order to achieve the above object, a first aspect of the present invention provides a composition for preparing intelligent temperature responsive polymer, the composition comprising two or more of the following components stored in admixture or separately:

bis-hydroxyethyl bis-hydroxypropyl stearyl ammonium chloride, ethylene bis-stearamide, and dimerized fatty acid, and optionally solvent;

in the composition, the content molar ratio of the bis-hydroxyethyl bis-hydroxypropyl stearyl ammonium chloride to the ethylene bis-stearamide to the dimerized fatty acid to the solvent is 1:1-1.5:3-4.5:0-10.

In a second aspect, the present invention provides an intelligent temperature responsive polymer, which comprises structural unit A, structural unit B and structural unit C, wherein the structural unit A is provided by bis-hydroxyethyl bis-hydroxypropyl stearyl ammonium chloride, the structural unit B is provided by ethylene bis-stearamide, and the structural unit C is provided by dimerized fatty acid, and the content molar ratio of the structural unit A to the structural unit B to the structural unit C in the polymer is 1:1-1.5:3-4.5.

In a third aspect, the present invention provides a method for preparing the intelligent temperature responsive polymer according to the second aspect, the method comprising: in the presence of protective gas, (1) the dosage molar ratio of bis-hydroxyethyl bis-hydroxypropyl stearyl ammonium chloride and dimerized fatty acid is 1:3-4.5, to carry out the first reaction between the two to obtain the first intermediate;

(2) contacting the first intermediate with ethylene bis-stearamide to carry out the second reaction to obtain the second intermediate, wherein the dosage molar ratio of the ethylene bis-stearamide to the bis-hydroxyethyl bis-hydroxypropyl stearyl ammonium chloride is 1-1.5:1;

(3) mixing the second intermediate with the solvent, wherein the dosage molar ratio of the solvent to the bis-hydroxyethyl bis-hydroxypropyl stearyl ammonium chloride is 2-10:1.

In a fourth aspect, the present invention provides the use of the intelligent temperature responsive polymer according to the second aspect in drilling fluid.

The fifth aspect of the present invention provides a biodiesel-based constant rheological property drilling fluid, which contains two or more of the following components stored in admixture or separately:

base oil biodiesel, aqueous phase, emulsifier, organic soil, constant rheological property flow pattern modifier, hydrolysis inhibitor, filtrate reducer and weighting material;

the constant rheological property flow pattern modifier is the intelligent temperature responsive polymer in the second aspect.

In a sixth aspect, the present invention provides a method for preparing the drilling fluid according to the fifth aspect, which comprising: mixing the components of the drilling fluid according to the fifth aspect.

Compared with the existing constant rheological property synthetic base drilling fluid technology, the biodiesel-based constant rheological property drilling fluid containing intelligent temperature responsive polymer provided by the present invention has at least the following advantages:

(1) the biodiesel-based constant rheological property drilling fluid system provided by the present invention has the advantages that the base oil is cheaper, the raw material source is wide and renewable, the preparation is simpler, and better economic benefits can be obtained in deepwater drilling application;

(2) the base oil used by the biodiesel-based constant rheological property drilling fluid system provided by the present invention has more excellent biodegradability, and can obtain better environmental benefits in deepwater drilling application;

(3) the biodiesel-based constant rheological property drilling fluid system provided by the present invention overcomes the defects of poor temperature resistance and performance deterioration caused by high-temperature easy hydrolysis of the conventional biodiesel-based drilling fluid, and can keep the performance basically stable after aging at 200° C.;

(4) the biodiesel-based constant rheological property drilling fluid system provided by the present invention overcomes the common problem of sensitivity to CaO of the conventional biodiesel-based drilling fluid, and still has excellent rheological property and temperature resistance when the CaO addition is high;

(5) the biodiesel-based constant rheological property drilling fluid system provided by the present invention overcomes the problems of low-temperature thickening and high-temperature viscosity reduction commonly existing in the conventional biodiesel-based drilling fluid, can keep dynamic shear force YP and 6r reading and static shear force Gel10 min basically constant within the range of 2-120° C., has constant rheological property equivalent to the prior constant rheological property synthetic base drilling fluid technology, and can meet the requirement of the prior marine deep water drilling.

Additional features and advantages of the present invention will be set forth in the detailed description which follows.

DETAILED DESCRIPTION OF THE EMBODIMENTS

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

As described above, the first aspect of the present invention provides a composition for preparing intelligent temperature responsive polymer, which comprises two or more of the following components stored in admixture or separately:

bis-hydroxyethyl bis-hydroxypropyl stearyl ammonium chloride, ethylene bis-stearamide, and dimerized fatty acid, and optionally solvent;

in the composition, the content molar ratio of the bis-hydroxyethyl bis-hydroxypropyl stearyl ammonium chloride to the ethylene bis-stearamide to the dimerized fatty acid to the solvent is 1:1-1.5:3-4.5:0-10.

Preferably, in the composition, the content molar ratio of the bis-hydroxyethyl bis-hydroxypropyl stearyl ammonium chloride to the ethylene bis-stearamide to the dimerized fatty acid to the solvent is 1:1-1.5:3-4.5:2-10.

Preferably, the concentration of the dimerized fatty acid is 80 wt. % or more. More preferably, the concentration of the dimerized fatty acid is 98 wt. % or more.

Preferably, the solvent is selected from at least one of triethylene glycol monobutyl ether, n-octanol, and tall oil fatty acid.

In the present invention, the solvent is mainly used for facilitating the discharge of the polymer and ensuring the fluidity of the polymer in normal application.

As described above, the second aspect of the present invention provides an intelligent temperature responsive polymer, which contains structural unit A, structural unit B and structural unit C, wherein the structural unit A is provided by bis-hydroxyethyl bis-hydroxypropyl stearyl ammonium chloride, the structural unit B is provided by ethylene bis-stearamide, and the structural unit C is provided by dimerized fatty acid, and the content molar ratio of the structural unit A to the structural unit B to the structural unit C in the polymer is 1:1-1.5:3-4.5.

Preferably, the concentration of the dimerized fatty acid providing the structural unit C is 80 wt. % or more. More preferably, the concentration of the dimerized fatty acid providing the structural unit C is 98 wt. % or more.

It should be noted that the corresponding substances forming the structural unit A, the structural unit B and the structural unit C in the polymer in the second aspect of the present invention are the corresponding substances in the composition in the first aspect of the present invention, and the kind and content of the corresponding substances are not described in detail in this aspect again by the skilled in the art, which should not be construed as limiting the present invention.

As described above, the third aspect of the present invention provides a method for preparing the intelligent temperature responsive polymer according to the second aspect, the method comprising: in the presence of protective gas, (1) the dosage molar ratio of bis-hydroxyethyl bis-hydroxypropyl stearyl ammonium chloride and dimerized fatty acid is 1:3-4.5, to carry out the first reaction between the two to obtain the first intermediate;

(2) contacting the first intermediate with ethylene bis-stearamide to carry out the second reaction to obtain the second intermediate, wherein the dosage molar ratio of the ethylene bis-stearamide to the bis-hydroxyethyl bis-hydroxypropyl stearyl ammonium chloride is 1-1.5:1;

(3) mixing the second intermediate with the solvent, wherein the dosage molar ratio of the solvent to the bis-hydroxyethyl bis-hydroxypropyl stearyl ammonium chloride is 2-10:1.

In the present invention, the protective gas is preferably nitrogen.

Preferably, in step (1), the conditions of the first reaction at least satisfy: the temperature is 120-180° C., the time is 0.5-6 h, and the stirring speed is 50-500 rpm; more preferably, the conditions of the first reaction at least satisfy: the temperature is 150-160° C., the time is 2-3 h, and the stirring speed is 250-300 rpm.

Preferably, in step (2), the conditions of the second reaction at least satisfy: the temperature is 150-200° C., the time is 1-8 h, and the stirring speed is 50-500 rpm; more preferably, the conditions of the second reaction at least satisfy: the temperature is 170-190° C., the time is 3-4 h, and the stirring speed is 250-300 rpm.

In the present invention, according to a preferred embodiment, the method for preparing the polymer comprises the steps of:

(1) weighing bis-hydroxyethyl bis-hydroxypropyl stearyl ammonium chloride and dimerized fatty acid, the dosage molar ratio of the two is 1:3-4.5, adding the two into a four-neck flask with a condenser, heating to 90-100° C. under the protection of nitrogen, mixing, heating the reaction system to 150-160° C. and stirring for 2-3 h at 250-300 rpm;

(2) keeping the stirring state, cooling to 90-100° C., weighing ethylene bis-stearamide, mixing the ethylene bis-stearamide with the system in the step (1), wherein the dosage molar ratio of the ethylene bis-stearamide to the bis-hydroxyethyl bis-hydroxypropyl stearyl ammonium chloride is 1-1.5:1, introducing nitrogen again for 10 min, raising the temperature to 170-190° C., and reacting for 3-4 h under the stirring at 250-300 rpm;

(3) weighing triethylene glycol monobutyl ether, mixing the triethylene glycol monobutyl ether with the system in the step (2), and discharging, wherein the dosage molar ratio of the triethylene glycol monobutyl ether to the bis-hydroxyethyl bis-hydroxypropyl stearyl ammonium chloride is 2-10:1.

The intelligent temperature responsive polymer obtained by the preparation method provided by the present invention can be used as a high-quality constant rheological property flow pattern modifier, and further can enable the drilling fluid to have more excellent constant rheological property.

As described above, the fourth aspect of the present invention provides the use of the intelligent temperature responsive polymer according to the second aspect in drilling fluid.

In the present invention, preferably, in the application, the polymer is used as a constant rheological property flow pattern modifier of biodiesel-based constant rheological property drilling fluid.

In the application of the polymer as the constant rheological property flow pattern modifier of the biodiesel-based constant rheological property drilling fluid, the specific application method is a technology well known by the skilled in the art, and the present invention is not described in detail herein.

When the polymer is used as the constant rheological property flow pattern modifier of biodiesel-based constant rheological property drilling fluid, the system can be subjected to low-temperature viscosity reduction and high-temperature viscosity increase, and dynamic shear force YP and 6r reading and final shear Gel10 min of the drilling fluid system are kept stable in a large temperature difference environment of 2-120° C., so that excellent constant rheological property is formed, and the polymer is more suitable for marine deep water drilling.

As described above, the fifth aspect of the present invention provides a biodiesel-based drilling fluid with constant rheological property, which contains two or more of the following components stored in admixture or separately:

base oil biodiesel, aqueous phase, emulsifier, organic soil, constant rheological property flow pattern modifier, hydrolysis inhibitor, filtrate reducer and weighting material;

the constant rheological property flow pattern modifier is the intelligent temperature responsive polymer in the second aspect.

Preferably, the content volume ratio of the base oil biodiesel to the aqueous phase is from 7:3 to 9:1; and based on a total of 100 mL of the base oil biodiesel and the aqueous phase, the content of the emulsifier is 2-8 g; the content of the organic soil is 1-3 g; the content of the constant rheological property flow pattern modifier is 0.5-2 g; the content of the hydrolysis inhibitor is 2-4 g; the content of the filtrate reducer is 2-3 g; the content of the weighting material is 55-200 g.

Preferably, the base oil biodiesel is a product prepared by base-catalyzed transesterification of vegetable oil and short-chain alcohol, wherein the content of unsaturated fatty acid in the vegetable oil is more than 60 wt. %, and the short-chain alcohol is monohydric or more than monohydric with 1 to 4 carbon atoms. Illustratively, the short-chain alcohol is at least one of methanol, ethanol, n-propanol, isopropanol, n-butanol, isobutanol, and tert-butanol.

In the present invention, the base oil biodiesel has lower cost and better environmental protection, and is beneficial to cost reduction and efficiency improvement of deepwater drilling.

According to a particularly preferred embodiment of the present invention, the method for preparing the base oil biodiesel comprises:

respectively weighing the transgenic soybean oil and absolute ethyl alcohol in a mass ratio of 3-5:1 for standby; adding catalyst NaOH (1-3 percent of the total mass of soybean oil and absolute ethyl alcohol) into absolute ethyl alcohol, stirring at 50-70° C. to obtain solution, mixing the solution with transgenic soybean oil preheated at 50-70° C. for 0.5-2 h, stirring at 50-70° C. for 0.5-2 h at constant temperature, standing the mixed solution for 20-28 h, and separating supernatant through a separating funnel to obtain the base oil biodiesel.

The inventors have found that the base oil biodiesel produced in the above preferred embodiment has a higher unsaturated acid ester content and better low temperature fluidity, compared to many other biodiesel having a poor low temperature fluidity and a freezing point even above zero.

Preferably, the aqueous phase is an aqueous phase having a degree of mineralization; more preferably, the aqueous phase with a degree of mineralization is a 20-30 wt. % aqueous solution of $CaCl_2$).

Preferably, the emulsifier is selected from at least one of Span85, Span80, Tween85, Tween80 and OP-10; more preferably, the emulsifier has an HLB value of 3 to 6; more preferably, the emulsifier has an HLB value of 3 to 4.

Preferably, the organic soil is a product prepared by ion exchange modification of bentonite through cation quaternary ammonium salt. Illustratively, the organic soil may be an organic soil available under the designation HFGEL-120 from ShiDaBoCheng company of Beijing.

Preferably, the hydrolysis inhibitor is selected from at least one of dicyclohexylcarbodiimide, bis (2, 6-diisopropylbenzene) carbodiimide, N,N-diisopropylcarbodiimide, 1-(3-dimethylaminopropyl)-3-ethylcarbodiimide hydrochloride; more preferably, the hydrolysis inhibitor is bis (2, 6-diisopropylbenzene) carbodiimide. The inventors of the present invention find that, particularly, when bis (2, 6-diisopropylbenzene) carbodiimide is used as the hydrolysis inhibitor in the scheme of the present invention, the temperature resistance and CaO compatibility of the system can be significantly improved, which is beneficial to maintaining stable performance in extreme environments, and further greatly improves the limit application range.

Preferably, the filtrate reducer is modified lignite. Illustratively, the modified lignite may be a modified lignite provided by ShiDaBoCheng company of Beijing under the brand number B-YJHM.

Preferably, the weighting material is barite. Illustratively, the barite may be a barite provided by ShiDaBoCheng company of Beijing.

Preferably, the drilling fluid also contains CaO; more preferably, the CaO is present in an amount of 3 to 5 g, based on 100 mL of the total amount of the base oil biodiesel and the aqueous phase.

As described above, the sixth aspect of the present invention provides a method for preparing the drilling fluid according to the fifth aspect, the method comprising: mixing the components of the drilling fluid according to the fifth aspect.

Preferably, the step of mixing the components of the drilling fluid comprises:

(a) first mixing the base oil biodiesel, the aqueous phase and the emulsifier to obtain a water-in-oil emulsion;

(b) second mixing the water-in-oil emulsion with the remaining components.

The order of addition of the components is not particularly limited in the present invention, and the operation familiar to the skilled in the art can be adopted, and it is recommended to prepare a water-in-oil emulsion first and then add the rest of the components to the emulsion.

Preferably, the first mixing and the second mixing are performed under stirring, and the stirring speeds of the first mixing and the second mixing are 10000-15000 rpm, respectively and independently.

More preferably, the stirring speeds of the first mixing and the second mixing are 10000-12000 rpm, respectively and independently.

In the present invention, there is no particular limitation on the preparation method of the drilling fluid, and the preparation method known to the skilled in the art can be adopted, and the present invention is not described herein in detail, and the present invention exemplifies a specific operation, and the skilled in the art should not be understood as limiting the present invention.

The present invention will be described in detail below by way of examples.

In the following examples, unless otherwise specified, the experimental instruments and raw materials are commercially available.

Experimental Instruments

Fann iX77 high temperature high pressure rheometer: purchased from Fann corporation, USA.

Fann 23D emulsion stability tester: purchased from Fann corporation, USA.

High temperature high pressure water loss instrument: purchased from Fann corporation, USA.

Raw Materials

Base oil biodiesel: prepared by the transgenic soybean oil and absolute ethyl alcohol by base catalysis transesterification.

Aqueous phase: 25 wt. % aqueous solution of $CaCl_2$).

Emulsifier: mixture of Span85 and Tween80 according to the mass ratio of 9:1, has an HLB value of 3.12.

Hydrolysis inhibitor: bis (2, 6-diisopropylbenzene) carbodiimide, commercially available under the trade designation AW 700.

Filtrate reducer: modified lignite, provided by ShiDaBoCheng company of Beijing and is sold as B-YJHM.

Organic soil: provided by ShiDaBoCheng company of Beijing, sold under the trade designation HFGEL-120.

Weighting material: barite, supplied by ShiDaBoCheng company of Beijing.

CaO: purchased from AnNaiJi chemical company, and the purity was analytical.

Raw materials for preparing the base oil biodiesel:

Absolute ethyl alcohol: purchased from AnNaiJi chemical company and having a purity of 99%.

Raw materials for preparing the constant rheological property flow pattern modifier:

Bis-hydroxyethyl bis-hydroxypropyl stearyl ammonium chloride: purchased from Meiyi Biotechnology Company under the trademark LM-26.

Ethylene bis-stearamide: purchased from Qingdao Jisi polymer materials, Inc., and sold under the trademark EBS.

Dimerized fatty acid: purchased from Shandong Yousuo chemical company, having a purity of 98%.

Triethylene glycol monobutyl ether: purchased from AnNaiJi chemical company, and the purity was analytical.

The basic composition of the base oil biodiesel used in the examples is shown in table 1. The carbon number distribution of the fatty acid chain segment of the prepared base oil biodiesel is mainly between C16 and C18, and the C18 unsaturated fatty acid ester accounts for more than 70 wt. %, wherein the content of linoleate is more than 50 wt. %.

The physical properties of the base oil biodiesel prepared are analyzed, and the results are shown in Table 2, the flash point of the biodiesel is far higher than that of gas oil Saraline 185V (117° C.) and low-toxicity solvent oil Escaid110 (80° C.), and is enough to meet the requirements of safe drilling construction in the deep water drilling process, the condensation point and the cold filter plugging point are −8° C. and −5° C., respectively, and are enough to meet the use in a water low-temperature environment (about 2-4° C.).

TABLE 1

| Components | Wt./% | CAS No. | Corresponding fatty acids Cm:n |
|---|---|---|---|
| Octanoic acid ethyl ester | 0.02-0.03 | 106-32-1 | C8:0 |
| Tetradecanoic acid ethyl ester | 0.1-0.2 | 124-06-1 | C14:0 |
| Pentadecanoic acid ethyl ester | 0.02-0.03 | 41114-00-5 | C15:0 |
| 9-Hexadecenoic acid ethyl ester | 0.1-0.2 | 54546-22-4 | C16:1 |
| Palm oil Ethyl ester | 15.0-16.0 | 628-97-7 | C16:0 |
| Heptadecanoic acid ethyl ester | 0.2-0.3 | 14010-23-2 | C17:0 |
| Linoleic acid ethyl ester | 51.0-52.0 | 7619-08-1 | C18:2 |
| Oleic acid ethyl ester | 20.0-21.0 | 111-62-6 | C18:1 |
| Stearic acid ethyl ester | 8.0-9.0 | 111-61-5 | C18:0 |
| Behenic acid ethyl ester | 1.0-2.0 | 5908-87-2 | C22:0 |

Note: In the Cm:n, m is the chain length of fatty acid in the original transgenic soybean oil, and n is the number of unsaturated bonds.

TABLE 2

| Items | The results | Unit | Detection standards |
|---|---|---|---|
| Kinematic viscosity (40° C.) | 5.108 | $mm^2/s$ | GB/T 265-1988 (2004) |
| Density (20° C.) | 882.4 | $kg/m^3$ | GB/T 1884-2000 (2004) |
| Open flash point | 196 | ° C. | GB/T 3536-2008 |
| Closed flash point | 142 | ° C. | GB/T 261-2008 |
| Condensation point | −8 | ° C. | GB/T 510-2018 |
| Cold filter plugging point | −5 | ° C. | SH/T 0248-2006 |

In the following examples, unless otherwise specified, the room temperature is 25±1° C. and the normal pressure is one atmospheric pressure, about 0.1013 MPa.

In the following examples, the test methods for the properties involved are as follows:

1. Rheological Property Test in Large Temperature Difference Range of 2-120° C.

After heating the drilling fluid for 16 h at 200° C., the drilling fluid is measured by a Fann iX77 high temperature high pressure rheometer from Fann company in America, the highest test temperature reaches 316° C., the highest test pressure reaches 30000 PSI (about 210 MPa), and the rheological properties of samples such as mud and the like under the low-temperature high-pressure state can be tested by matching with an external condenser, wherein the lowest test temperature can reach −15° C., and the pressure can reach 210 MPa. The scale readings of each example were tested at 600 revolutions (Φ600), 300 revolutions (Φ300), 6 revolutions (Φ6), and 3 revolutions (Φ3) at 2° C., 30° C., 60° C., 90° C., and 120° C., wherein the rheological property at 120° C. was measured at 1000 PSI (about 6.89 MPa) on normal pressure basis due to boiling at 120° C. under normal pressure of the drilling fluid.

According to the experimental results, each rheological parameter is calculated according to the following formula:
1) Apparent Viscosity (AV)=½×Φ600, unit mPa·s
2) Plastic Viscosity (PV)=Φ600−Φ300, unit mPa·s
3) Dynamic shear force (YP)=½×(Φ300−PV), unit Pa
4) Final shear force (Gel10 min)=½×Φ3 (read after 10 min standing), unit Pa 2. Demulsification Voltage Test The electrical stability of water-in-oil emulsion was evaluated using a Fann 23D emulsion stability tester from Fann corporation, USA. The Electrical Stability (ES) of water-in-oil emulsion is represented by the demulsification voltage.

(1) Switching on the power supply of the tester, pressing the Reset key to zero the reading of the display screen;

(2) pouring liquid to be detected into a beaker, inserting the electrode into the liquid level below 2.5 cm, and enabling the electrode not to contact the edge or the bottom of the beaker;

(3) pressing the Test button without moving the electrode, wherein the reading of the digital display screen is gradually increased;

(4) when the reading of the display screen stops increasing, the liquid is indicated to be broken down by voltage, and the value at the moment is recorded to be the demulsification voltage of the measured drilling fluid;

(5) after use, the paper towel is passed through the gap between the electrode plates to wipe off the electrode completely.

3. High Temperature High Pressure Fluid Loss Test

The high temperature high pressure fluid loss test is carried out by adopting a high temperature high pressure water loss instrument produced by Fann company in America, and the experimental steps are as follows:

(1) after the power supply is switched on, the thermometer is placed into the jack of the heating sleeve and is preheated to 5±1° C. higher than the required temperature;

(2) firstly stirring the drilling fluid to be measured at a high speed for 10 min, then pouring the drilling fluid into a drilling fluid container, ensuring that the distance between the liquid level and the top of the container is about 13 mm, putting special filter paper for the drilling fluid, covering a cup cover and fixing it with screws;

(3) after closing the top valve of the cup cover and the bottom valve of the water loss instrument, putting the drilling fluid container into a heating sleeve, and inserting another thermometer;

(4) connecting the air source pipeline with the top and the bottom of the drilling fluid container, adjusting the back pressure to 1998 kPa, opening the top air inlet valve, and heating the temperature to the temperature required by the experiment within 1 h;

(5) after the experiment temperature is constant, adjusting the top pressure of the water loss instrument to the pressure matched with the experiment temperature, opening the valve at the bottom of the water loss instrument, starting timing at the same time, and collecting the volume of filtrate within 30 min and within ±3° C. of the temperature required by the experiment;

(6) closing the top valve and the bottom valve of the water loss instrument, the air source and the power supply in sequence, taking down the drilling fluid container in the high-temperature state, cooling the drilling fluid container to room temperature in the upright state, slowly releasing the pressure in the container completely, opening the cup cover, taking out the filter paper, slowly flushing floating mud on the surface of the filter cake with water, measuring and recording the characteristics of the filter cake, such as thickness, toughness, hardness and the like, and cleaning and wiping the water loss instrument after the experiment is finished.

Preparation Example 1

Constant rheological property flow pattern modifier: respectively weighing 1 mmol of bis-hydroxyethyl bis-hydroxypropyl stearyl ammonium chloride and 4 mmol of dimerized fatty acid, adding the two into a four-neck flask provided with a condenser, heating to 90° C. under the protection of nitrogen until the two are completely mixed, then slowly heating the reaction system to 160° C., stirring for 2 h at 250 rpm, then keeping the sample in the stirring state, cooling to 100° C., adding 1 mmol of ethylene bis-stearamide into the system, introducing nitrogen for 10 minutes again, quickly heating to 175° C., continuously reacting for 4 h under the stirring of 250 rpm, then adding 6 mmol of triethylene glycol monobutyl ether into the system, uniformly stirring, and discharging while hot to obtain the constant rheological property flow pattern modifier AA-1.

Preparation Example 2

Constant rheological property flow pattern modifier: respectively weighing 1 mmol of bis-hydroxyethyl bis-hydroxypropyl stearyl ammonium chloride and 3 mmol of dimerized fatty acid, adding the two into a four-neck flask provided with a condenser, heating to 100° C. under the protection of nitrogen until the two are completely mixed, then slowly heating the reaction system to 160° C., stirring for 3 h at 300 rpm, then keeping the sample in the stirring state, cooling to 100° C., adding 1 mmol of ethylene bis-stearamide into the system, introducing nitrogen for 10 minutes again, quickly heating to 175° C., continuously reacting for 4 h under the stirring of 300 rpm, then adding 2 mmol of triethylene glycol monobutyl ether into the system, uniformly stirring, and then discharging while hot to obtain the constant rheological property flow pattern modifier AA-2.

Preparation Example 3

Constant rheological property flow pattern modifier: respectively weighing 1 mmol of bis-hydroxyethyl bis-hydroxypropyl stearyl ammonium chloride and 4.5 mmol of dimerized fatty acid, adding the two into a four-neck flask equipped with a condenser, heating to 95° C. under the protection of nitrogen until the two are completely mixed, then slowly heating the reaction system to 160° C., stirring for 2.5 h at 280 rpm, then keeping the sample in the stirring state, cooling to 100° C., adding 1.5 mmol of ethylene bis-stearamide into the system, introducing nitrogen again for 10 minutes, quickly heating to 175° C., continuously reacting for 4 h under the stirring of 280 rpm, then adding 10 mmol of triethylene glycol monobutyl ether into the system, uniformly stirring, and then discharging while hot to obtain the constant rheological property flow pattern modifier AA-3.

Comparative Preparation Example 1

This comparative preparation example was carried out in a similar manner to preparation example 1, except that 1 mmol, 0.8 mmol, 2 mmol and 1 mmol of bis-hydroxyethyl bis-hydroxypropyl stearyl ammonium chloride, ethylene bis-stearamide, dimerized fatty acid and triethylene glycol monobutyl ether were used in this comparative preparation example, respectively.

Obtaining the constant rheological property flow pattern modifier DAA-1.

Comparative Preparation Example 2

This comparative preparation example was carried out in a similar manner to preparation example 1, except that 1 mmol, 3 mmol, 6 mmol and 15 mmol of bis-hydroxyethyl bis-hydroxypropyl stearyl ammonium chloride, ethylene bis-stearamide, dimerized fatty acid and triethylene glycol monobutyl ether were used in this comparative preparation example, respectively.

Obtaining the constant rheological property flow pattern modifier DAA-2.

Example 1

The formulation of the drilling fluid is specified in table 3;

preparing the drilling fluid:

(a) first mixing the base oil biodiesel, the aqueous phase and the emulsifier to obtain a water-in-oil emulsion at room temperature (the rotating speed is 12000 rpm);

(b) second mixing the water-in-oil emulsion with the remaining components of Table 3 forming the drilling fluid at room temperature (the rotating speed is 12000 rpm);

thus obtaining the biodiesel-based constant rheological property drilling fluid BB-1.

The rest of the examples use a similar way to example 1, except that the drilling fluid used was a different formulation from that of example 1, the specific formulation is shown in table 3, and the rest is the same as example 1, the drilling fluid was prepared.

TABLE 3

| | Example 1 | Example 2 | Example 3 | Example 4 | Example 5 | Example 6 | Example 7 | Example 8 |
|---|---|---|---|---|---|---|---|---|
| Base oil biodiesel/mL | 240 | 240 | 240 | 210 | 240 | 240 | 240 | 240 |
| Aqueous phase/mL | 60 | 60 | 60 | 60 | 90 | 60 | 60 | 60 |
| Emulsifier/g | 9 | 9 | 9 | 9 | 9 | 9 | 9 | 9 |
| Organic soil/g | 6 | 6 | 6 | 6 | 6 | 6 | 6 | 6 |
| Constant rheological property flow pattern modifier | | | | | | | | |
| Dosage/g | 3 | 1.5 | 6 | 3 | 3 | 3 | 3 | 3 |
| Species | AA-1 | AA-2 | AA-3 | AA-1 | AA-1 | AA-1 | AA-1 | AA-1 |
| Hydrolysis inhibitor/g | 6 | 6 | 6 | 6 | 6 | 6 | 3 | 6 |
| CaO/g | 9 | 9 | 9 | 0 | 9 | 9 | 9 | 18 |
| Filtrate reducer/g | 9 | 9 | 9 | 9 | 9 | 9 | 9 | 9 |
| Barite/g | 165 | 165 | 165 | 165 | 165 | 600 | 165 | 165 |

| | Example 1 | Comparative example 1 | Comparative example 2 | Comparative example 3 | Comparative example 4 | Comparative example 5 |
|---|---|---|---|---|---|---|
| Base oil biodiesel/mL | 240 | 240 | 240 | 240 | 240 | 240 |
| Aqueous phase 60/mL | 60 | 60 | 60 | 60 | 60 | |
| Emulsifier/g | 9 | 9 | 9 | 9 | 9 | 9 |
| Organic soil/g | 6 | 6 | 6 | 6 | 6 | 6 |
| Constant rheological property flow pattern modifier | | | | | | |
| Dosage/g | 3 | 0 | 3 | 3 | 3 | 3 |
| Species | AA-1 | / | AA-1 | AA-1 | DAA-1 | DAA-2 |
| Hydrolysis inhibitor/g | 6 | 6 | 0 | 0 | 6 | 6 |
| CaO/g | 9 | 9 | 9 | 0 | 9 | 9 |
| Filtrate reducer/g | 9 | 9 | 9 | 9 | 9 | 9 |
| Barite/g | 165 | 165 | 165 | 165 | 165 | 165 |

Test Example

The foregoing examples were tested for scale readings of 600, 300, 6, and 3 revolutions at 2° C., 30° C., 60° C., 90° C., and 120° C., wherein the rheological property at 120° C. was measured at 1000 PSI on normal pressure basis due to boiling at 120° C. under normal pressure of the drilling fluid.

The evaluation results of each example are shown in the following table.

TABLE 4 test results of example 1

| Temperature/°C. | AV/mPa.s | PV/mPa.s | YP/Pa | 6r | 10 min Gel | ES/V | HTHP/ml |
|---|---|---|---|---|---|---|---|
| 2 | 64 | 51 | 13 | 11 | 11 | 1264 | 3.6 |
| 30 | 43 | 31 | 12 | 10 | 11 | | |
| 60 | 38 | 25 | 13 | 12 | 10 | | |
| 90 | 35 | 22 | 13 | 10 | 12 | | |
| 120 | 36 | 24 | 12 | 12 | 13 | | |

TABLE 5 test results of example 2

| Temperature/°C. | AV/mPa.s | PV/mPa.s | YP/Pa | 6r | 10 min Gel | ES/V | HTHP/ml |
|---|---|---|---|---|---|---|---|
| 2 | 62 | 50 | 12 | 10 | 11 | 1237 | 3.2 |
| 30 | 41 | 29 | 12 | 10 | 12 | | |
| 60 | 35 | 24 | 11 | 11 | 11 | | |
| 90 | 34 | 22 | 12 | 11 | 11 | | |
| 120 | 33 | 21 | 12 | 10 | 10 | | |

TABLE 6 test results of example 3

| Temperature/°C. | AV/mPa.s | PV/mPa.s | YP/Pa | 6r | 10 min Gel | ES/V | HTHP/ml |
|---|---|---|---|---|---|---|---|
| 2 | 66 | 53 | 13 | 12 | 13 | 1334 | 2.8 |
| 30 | 45 | 32 | 13 | 12 | 12 | | |
| 60 | 40 | 27 | 13 | 13 | 12 | | |
| 90 | 36 | 24 | 12 | 13 | 13 | | |
| 120 | 36 | 24 | 12 | 13 | 13 | | |

TABLE 7 test results of example 4

| Temperature/°C. | AV/mPa.s | PV/mPa.s | YP/Pa | 6r | 10 min Gel | ES/V | HTHP/ml |
|---|---|---|---|---|---|---|---|
| 2 | 62 | 50 | 12 | 11 | 10 | 1277 | 4.4 |
| 30 | 45 | 32 | 13 | 10 | 11 | | |
| 60 | 37 | 24 | 13 | 10 | 9 | | |
| 90 | 33 | 22 | 11 | 12 | 10 | | |
| 120 | 34 | 23 | 11 | 11 | 12 | | |

TABLE 8 test results of example 5

| Temperature/°C. | AV/mPa.s | PV/mPa.s | YP/Pa | 6r | 10 min Gel | ES/V | HTHP/ml |
|---|---|---|---|---|---|---|---|
| 2 | 68 | 52 | 16 | 13 | 16 | 902 | 3.8 |
| 30 | 53 | 38 | 15 | 11 | 14 | | |
| 60 | 41 | 26.5 | 14.5 | 12 | 13 | | |
| 90 | 46 | 31 | 15 | 13 | 15 | | |
| 120 | 48 | 33.5 | 14.5 | 15 | 18 | | |

TABLE 9 test results of example 6

| Temperature/°C. | AV/mPa.s | PV/mPa.s | YP/Pa | 6r | 10 min Gel | ES/V | HTHP/ml |
|---|---|---|---|---|---|---|---|
| 2 | 82 | 64 | 18 | 17 | 21 | 2000+ | 2.2 |
| 30 | 69 | 53 | 16 | 15 | 17 | | |
| 60 | 52 | 35 | 17 | 14 | 17 | | |
| 90 | 53 | 38 | 15 | 15 | 18 | | |
| 120 | 59 | 44 | 15 | 16 | 26 | | |

TABLE 10 test results of example 7

| Temperature/°C. | AV/mPa.s | PV/mPa.s | YP/Pa | 6r | 10 min Gel | ES/V | HTHP/ml |
|---|---|---|---|---|---|---|---|
| 2 | 72 | 58 | 14 | 14 | 15 | 1023 | 5.6 |
| 30 | 54 | 43 | 11 | 10 | 11 | | |
| 60 | 36 | 26 | 10 | 11 | 10 | | |
| 90 | 35 | 24 | 11 | 10 | 10 | | |
| 120 | 35 | 25 | 10 | 10 | 10 | | |

TABLE 11 test results of example 8

| Temperature/°C. | AV/mPa.s | PV/mPa.s | YP/Pa | 6r | 10 min Gel | ES/V | HTHP/ml |
|---|---|---|---|---|---|---|---|
| 2 | 92 | 68 | 24 | 22 | 26 | 778 | 8.6 |
| 30 | 74 | 57 | 17 | 15 | 16 | | |
| 60 | 58 | 45 | 13 | 14 | 15 | | |
| 90 | 44 | 30 | 14 | 15 | 15 | | |
| 120 | 42 | 30 | 12 | 14 | 14 | | |

TABLE 12 test results of comparative example 1

| Temperature/°C. | AV/mPa.s | PV/mPa.s | YP/Pa | 6r | 10 min Gel | ES/V | HTHP/ml |
|---|---|---|---|---|---|---|---|
| 2 | 83 | 61 | 22 | 26 | 24 | 1285 | 5.2 |
| 30 | 62 | 45 | 17 | 16 | 18 | | |
| 60 | 32 | 21 | 11 | 9 | 9 | | |
| 90 | 28 | 20 | 8 | 7 | 7 | | |
| 120 | 24 | 19 | 5 | 4 | 5 | | |

TABLE 13 test results of comparative example 3

| Temperature/°C. | AV/mPa.s | PV/mPa.s | YP/Pa | 6r | 10 min Gel | ES/V | HTHP/ml |
|---|---|---|---|---|---|---|---|
| 2 | 77 | 61 | 16 | 18 | 16 | 974 | 6.4 |
| 30 | 56 | 43 | 13 | 11 | 13 | | |
| 60 | 35 | 25 | 10 | 9 | 12 | | |
| 90 | 32 | 23 | 9 | 8 | 12 | | |
| 120 | 29 | 20 | 9 | 9 | 9 | | |

TABLE 14 test results of comparative example 4

| Temperature/ °C. | AV/ mPa.s | PV/ mPa.s | YP/ Pa | 6r | 10 min Gel | ES/V | HTHP/ ml |
|---|---|---|---|---|---|---|---|
| 2 | 79 | 59 | 20 | 20 | 22 | 1197 | 3.6 |
| 30 | 61 | 46 | 15 | 13 | 15 | | |
| 60 | 30 | 19 | 11 | 10 | 10 | | |
| 90 | 27 | 18 | 9 | 7 | 7 | | |
| 120 | 23 | 16 | 7 | 4 | 5 | | |

TABLE 15 test results of comparative example 5

| Temperature/ °C. | AV/ mPa.s | PV/ mPa.s | YP/ Pa | 6r | 10 min Gel | ES/V | HTHP/ ml |
|---|---|---|---|---|---|---|---|
| 2 | 77 | 61 | 16 | 17 | 18 | 1228 | 2.8 |
| 30 | 58 | 44 | 14 | 15 | 16 | | |
| 60 | 34 | 24 | 10 | 8 | 9 | | |
| 90 | 28 | 19 | 9 | 8 | 9 | | |
| 120 | 27 | 18 | 9 | 9 | 10 | | |

From the test results of the tables, the biodiesel-based constant rheological property drilling fluid containing intelligent temperature responsive polymer provided by the present invention has excellent temperature resistance, CaO compatibility and constant rheological property.

In particular, it can be seen from the results of examples 1-3 that the biodiesel-based constant rheological property drilling fluid containing intelligent temperature responsive polymer provided by the present invention shows excellent constant rheological property, stability and fluid loss after aging at 200° C.

Compared with the example 1, the example 4 does not add CaO, and the integral performance difference of the system is not large, which shows that the biodiesel-based constant rheological property drilling fluid provided by the present invention has excellent CaO compatibility.

Example 5 compared to example 1, the oil-water ratio was adjusted from 80:20 to 70:30, the rheological parameters of the system were increased, the demulsification voltage was reduced, and good constant rheological property and fluid loss were maintained.

Example 6 compared to example 1, the density was adjusted from 1.2 g/cm$^3$ to 2.0 g/cm$^3$, the rheological parameters and the demulsification voltage of the system were both increased, and good constant rheological property and fluid loss were maintained.

Example 7 compared to example 1, the addition of hydrolysis inhibitor was reduced by half, the system has constant rheological property at 30-120° C., and weak tackifying and chopping phenomena occur at 2° C., which shows that the base oil of the system of example 7 was hydrolyzed to some extent to cause partial saponification of the system due to insufficient addition of hydrolysis inhibitor, but the degree is weak.

Example 8 compared to example 1, the addition of CaO was doubled, and the system as a whole showed tackifying and chopping phenomena in the range of 2-120° C., wherein the rheological property were constant at 60-120° C., and the viscosity increasing and shear increasing were severe at 60° C. or below, indicating that although the hydrolysis inhibitor is added, if too much CaO was added, it would still cause the hydrolysis and saponification of the base oil of the system, and thus CaO should be used in a reasonable range.

Comparative example 1 compared to example 1, the constant rheological property flow pattern modifier, the system is obviously thickened at low temperature and subjected to high-temperature viscosity reduction, indicating that the constant rheological property flow pattern modifier plays a key role in the constant rheological property performance of the system.

Comparative example 2 compared to example 1, without addition of the hydrolysis inhibitor, which was not tested because the system was completely cured after aging at 200° C., showed that CaO greatly promoted the hydrolysis of the base oil and caused the saponification of the system, deteriorating the rheology of the system and making it unusable without the hydrolysis inhibitor.

Comparative example 3 compared to example 1, without addition of the hydrolysis inhibitor and CaO, the system had constant rheological properties at 30-120° C., and a significant tackifying and chopping phenomena occurred at 2° C., due to partial saponification of the system caused by some degree of hydrolysis of the system base oil of comparative example 3.

Comparative example 4 compared to example 1, the addition amount of the dimerized fatty acid in the preparation raw materials of the flow pattern modifier is greatly reduced, so that the polymerization degree of the polymer is poor, and the function of rheological property regulation in a large temperature difference range cannot be effectively exerted, so that the system does not have ideal constant rheological property.

In conclusion, the biodiesel-based constant rheological property drilling fluid provided by the present invention has excellent temperature resistance and CaO compatibility, can maintain constant rheological property within a large temperature range of 2-120° C. under different oil-water ratios and densities, and is suitable for deep water drilling with large temperature difference.

The preferred embodiments of the present invention have been described above in detail, but the present invention is not limited thereto. Within the scope of the technical idea of the present invention, many simple modifications can be made to the technical solution of the present invention, including various technical features being combined in any other suitable way, and these simple modifications and combinations should also be regarded as the disclosure of the present invention, and all fall within the scope of the present invention.

The invention claimed is:

1. A biodiesel-based constant rheological property drilling fluid containing intelligent temperature responsive polymer, wherein the drilling fluid comprising two or more of the following components which are stored in admixture or separately:
   base oil biodiesel, aqueous phase, emulsifier, organic soil, constant rheological property flow pattern modifier, hydrolysis inhibitor, filtrate reducer and weighting material;
   the constant rheological property flow pattern modifier is the intelligent temperature responsive polymer, the polymer contains structural unit A, structural unit B and structural unit C, the structural unit A is provided by bis-hydroxyethyl bis-hydroxypropyl stearyl ammonium chloride, the structural unit B is provided by ethylene bis-stearamide, the structural unit C is provided by dimerized fatty acid, and in the polymer, the content molar ratio of the structural unit A to the structural unit B to the structural unit C is 1:1-1.5:3-4.5.

2. The drilling fluid according to claim 1, wherein the concentration of the dimerized fatty acid providing the structural unit C is 80 wt. % or more.

3. The drilling fluid according to claim 1, wherein the concentration of the dimerized fatty acid providing the structural unit C is 98 wt. % or more.

4. The drilling fluid according to claim 1, wherein the content volume ratio of the base oil biodiesel to the aqueous phase is from 7:3 to 9:1; and based on a total of 100 mL of the base oil biodiesel and the aqueous phase, the content of the emulsifier is 2-8 g; the content of the organic soil is 1-3 g; the content of the constant rheological property flow pattern modifier is 0.5-2 g; the content of the hydrolysis inhibitor is 2-4 g; the content of the filtrate reducer is 2-3 g; the content of the weighting material is 55-200 g.

5. The drilling fluid according to claim 1, wherein the base oil biodiesel is a product obtained by base-catalyzed transesterification of vegetable oil and short-chain alcohol, wherein the vegetable oil has an unsaturated fatty acid content of 60 wt. % or more, and the short-chain alcohol is monohydric or more than monohydric with 1 to 4 carbon atoms.

6. The drilling fluid according to claim 1, wherein the aqueous phase is an aqueous phase having a degree of mineralization.

7. The drilling fluid according to claim 1, wherein the aqueous phase with mineralization degree is a 20-30 wt. % aqueous solution of $CaCl_2$).

8. The drilling fluid according to claim 1, wherein the emulsifier is selected from at least one of Span85, Span80, Tween85, Tween80 and OP-10.

9. The drilling fluid according to claim 1, wherein the organic soil is a product prepared by ion exchange modification of bentonite through cation quaternary ammonium salt.

10. The drilling fluid according to claim 1, wherein the hydrolysis inhibitor is selected from at least one of dicyclohexylcarbodiimide, bis (2, 6-diisopropylbenzene) carbodiimide, N,N-diisopropylcarbodiimide, 1-(3-dimethylaminopropyl)-3-ethylcarbodiimide hydrochloride.

11. The drilling fluid according to claim 1, wherein the weighting material is barite.

12. The drilling fluid according to claim 1, wherein the HLB value of the emulsifier is 3-6.

13. The drilling fluid according to claim 1, wherein the drilling fluid further comprises CaO.

14. The drilling fluid according to claim 1, wherein the CaO content is 3-5 g based on 100 mL of the total amount of the base oil biodiesel and the aqueous phase.

15. The drilling fluid according to claim 1, wherein the intelligent temperature responsive polymer is a polymer prepared by a method comprising the steps of:
in the presence of protective gas,
(1) the dosage molar ratio of bis-hydroxyethyl bis-hydroxypropyl stearyl ammonium chloride and dimerized fatty acid is 1:3-4.5, to carry out the first reaction between the two to obtain the first intermediate;
(2) contacting the first intermediate with ethylene bis-stearamide to carry out the second reaction to obtain the second intermediate, wherein the dosage molar ratio of the ethylene bis-stearamide to the bis-hydroxyethyl bis-hydroxypropyl stearyl ammonium chloride is 1-1.5:1;
(3) mixing the second intermediate with the solvent, wherein the dosage molar ratio of the solvent to the bis-hydroxyethyl bis-hydroxypropyl stearyl ammonium chloride is 2-10:1.

16. The drilling fluid according to claim 15, wherein in step (1), the conditions of the first reaction at least satisfy: the temperature is 120-180° C., the time is 0.5-6 h, and the stirring speed is 50-500 rpm.

17. The drilling fluid according to claim 15, wherein in step (2), the conditions of the second reaction at least satisfy: the temperature is 150-200° C., the time is 1-8 h, and the stirring speed is 50-500 rpm.

18. The drilling fluid according to claim 15, wherein in step (3), the solvent is selected from at least one of triethylene glycol monobutyl ether, n-octanol and tall oil fatty acid.

19. The drilling fluid according to claim 1, wherein the drilling fluid is a drilling fluid prepared by a method comprising the steps of:
mixing the components of the drilling fluid; the step of mixing the components of the drilling fluid comprises:
(a) first mixing the base oil biodiesel, the aqueous phase and the emulsifier to obtain a water-in-oil emulsion;
(b) second mixing the water-in-oil emulsion with the remaining components.

20. The drilling fluid according to claim 19, wherein the first mixing and the second mixing are performed under stirring, and the stirring speeds of the first mixing and the second mixing are 10000-15000 rpm, respectively and independently.

* * * * *